United States Patent
Reshef et al.

(10) Patent No.: US 7,215,672 B2
(45) Date of Patent: May 8, 2007

(54) ATM LINKED LIST BUFFER SYSTEM

(76) Inventors: Koby Reshef, 2 Gosh Ezion St., Hadera (IL); Yochai Parchak, 65 Hanesher St., Raanana (IL); Amir Cohen, P.O. 457, Kfar Hes (IL); David Shyken, Bazel St. 25, Herzeliya (IL) 46660

( * ) Notice: Subject to any disclaimer, the term of this patent is extended or adjusted under 35 U.S.C. 154(b) by 704 days.

(21) Appl. No.: 09/804,929

(22) Filed: Mar. 13, 2001
(Under 37 CFR 1.47)

(65) Prior Publication Data

US 2002/0131421 A1 Sep. 19, 2002

(51) Int. Cl.
*H04L 12/28* (2006.01)

(52) U.S. Cl. .............................. 370/395.1; 370/395.64; 370/412

(58) Field of Classification Search ............. 370/395.1, 370/395.64, 412, 236.2, 395.31, 395.42, 370/395.72; 710/52
See application file for complete search history.

(56) References Cited

U.S. PATENT DOCUMENTS

| | | | |
|---|---|---|---|
| 5,892,762 A * | 4/1999 | Okuda et al. ................ | 370/395 |
| 5,893,162 A * | 4/1999 | Lau et al. .................... | 711/153 |
| 6,021,115 A * | 2/2000 | Simpson et al. ............. | 370/235 |
| 6,151,301 A | 11/2000 | Holden | |
| 2002/0031132 A1* | 3/2002 | McWilliams ................ | 370/401 |

FOREIGN PATENT DOCUMENTS

| | | |
|---|---|---|
| EP | 0 472 408 A2 | 2/1992 |
| EP | 0 472 408 A3 | 2/1992 |

* cited by examiner

*Primary Examiner*—Duc Ho
(74) *Attorney, Agent, or Firm*—Sonnenschein Nath & Rosenthal LLP

(57) ABSTRACT

A linked list buffer circuit can be configured to store different linked lists. The buffer includes insert logic and an insert state machine to add ATM cells to the linked lists in the buffer. Extract logic and an extract state machine allow for the removal of ATM cells from the linked lists in the buffer. Because, ATM cells can have different levels of priority, programmable monitor circuitry is provided to monitor the linked lists in the buffer. The monitor circuitry keeps track of buffer and list capacity, and also keeps track of cell loss priority and delay priority cells of the buffer and the linked lists. This information is used to drop received cells if necessary. The linked list monitor circuitry can be configured based upon the linked list configuration of the buffer. The linked list monitor can be configured by changing threshold levels provided to counter/comparator circuitry. Assignments of internal counter circuitry are also programmable based upon the buffer configuration.

19 Claims, 19 Drawing Sheets

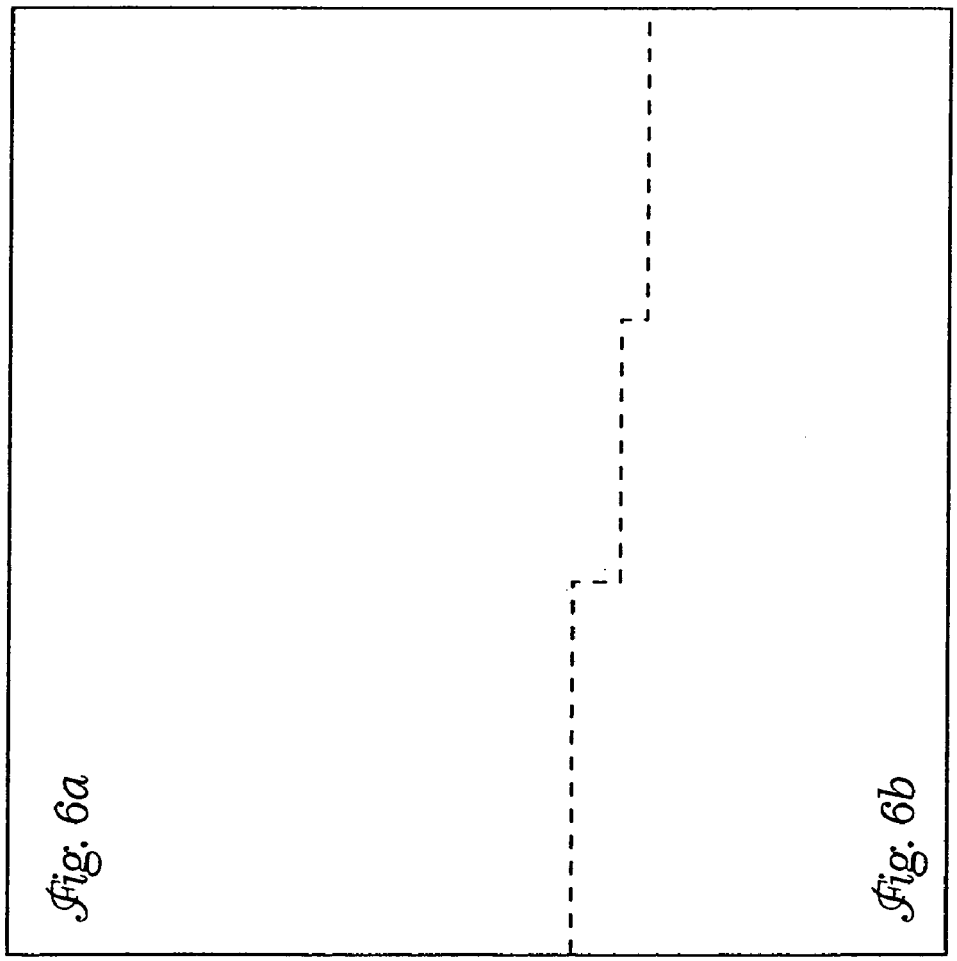

ATM LINKED LIST BUFFER SYSTEM

TECHNICAL FIELD OF THE INVENTION

The present invention relates generally to communication buffers and in particular the present invention relates to asynchronous transfer mode (ATM) buffer systems.

BACKGROUND OF THE INVENTION

ATM (Asynchronous Transfer Mode) is a network technology for both local area networks (LANs) and wide area networks (WANs) that supports real-time voice and video as well as data. The topology uses switches that establish a logical circuit from communication end to end, which guarantees a quality of service for transmissions. However, unlike telephone switches that dedicate circuits end to end, unused bandwidth in ATM's logical circuits can be appropriated whenever available. For example, idle bandwidth in a videoconference circuit can be used to transfer data.

ATM works by transmitting all traffic using fixed-length, 53-byte, cells. This fixed unit allows very fast switches to be built, because it is much faster to process a known packet size than variable length packets. The small ATM packet also ensures that voice and video can be inserted into the stream often enough for real-time transmission.

The ability to specify a quality of service is one of ATM's most important features, allowing voice and video to be transmitted smoothly. The following levels of service are available: Constant Bit Rate (CBR) guarantees bandwidth for real-time voice and video; Real-time variable Bit Rate (rt-VBR) supports interactive multimedia that requires minimal delays, and non-real-time variable bit rate (nrt-VBR) is used for bursty transaction traffic; Available Bit Rate (ABR) adjusts bandwidth according to congestion levels for LAN traffic; and Unspecified Bit Rate (UBR) provides a best effort for non-critical data such as file transfers.

An asynchronous transfer mode (ATM) network comprises a layered architecture allowing multiple services like voice, data and video, to be mixed over a network. The network includes an interface to a physical communication medium, and data can be communicated through buffer circuits. Typically, a buffer circuit is provided that can communicate with a predetermined number of communication ports provided through the physical medium, such as sixteen (16). Often, however, the number and priority of ports varies between ATM systems.

For the reasons stated above, and for other reasons stated below which will become apparent to those skilled in the art upon reading and understanding the present specification, there is a need in the art for an adjustable ATM buffer and management circuitry.

SUMMARY OF THE INVENTION

The above-mentioned problems with ATM buffer circuitry and other problems are addressed by the present invention and will be understood by reading and studying the following specification.

In one embodiment, an ATM buffer system comprises a configurable buffer circuit to store a plurality of ATM linked lists, and a linked list monitor to monitor the plurality of ATM linked lists, wherein the linked list monitor is configurable to monitor different length linked lists. In another embodiment, a linked list buffer system comprises a buffer having a plurality of data storage locations, wherein the buffer can store a plurality of different linked list configurations, and a management system coupled to the buffer and comprising a plurality of counter circuits having adjustable threshold values, wherein the adjustable threshold values can be programmed to correspond to the plurality of different linked list configurations of the buffer.

An asynchronous transfer mode (ATM) buffer system comprises a universal test and operations interface (UTOPIA) output connection, a low voltage differential signal (LVDS) input connection and a buffer circuit coupled between the LVDS input connection and the UTOPIA output connection. The buffer circuit comprises insert logic to insert ATM cells into the plurality of ATM linked lists stored in the buffer circuit, and extract logic to remove the ATM cells from the plurality of ATM linked lists. A linked list monitor is coupled to the buffer circuit and comprising a plurality of first counter circuits and a plurality of comparator circuits coupled to the plurality of first counter circuits. The plurality of comparator circuits compares a count from the plurality of first counter circuits to first and second threshold values. Control circuitry is coupled to the plurality of comparator circuits to selectively increment or decrement the count of the plurality of first counter circuits.

In yet another embodiment, a method of operating an ATM buffer comprises receiving an ATM cell comprising a header and data, wherein the header includes an indication of a priority level of the ATM cell. A count value of linked list length stored in the ATM buffer is incremented, and the count value is compared to a linked list length overflow threshold value. The method further comprises determining if the count value exceeds the linked list length overflow threshold value, comparing the count value to a linked list length priority threshold value, and determining if the count value exceeds the linked list length priority threshold value.

The present invention is not limited to the above summary, and other embodiments are described and claimed herein.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Prior to describing the present invention in detail, definitions of some ATM terms are provided in the following section. Cell Loss Priority (CLP) is a bit in an ATM header that indicates one of two levels of priority for the ATM cell. A CLP=0 indicates a higher priority than cells with a CLP=1. As such, lower priority cells, CLP=1, may be discarded during times of congestion to preserve the cell loss ratio (CLR) of CLP=0 cells. CLR is a negotiated quality parameter that is an acceptable value established by a network. The CLR is defined as lost cells divided by the total transmitted cells.

A constant bit rate (CBR) is used to describe communications that use a constant transmission rate. In contrast, an undefined bit rate (UBR) is a communication that is not uniform, or contains bursts of data.

A Universal Test and Operations Interface for ATM (UTOPIA) is an electrical interface between the transmission convergence (TC) and the physical medium (PM) of the physical layer.

Figure 1:
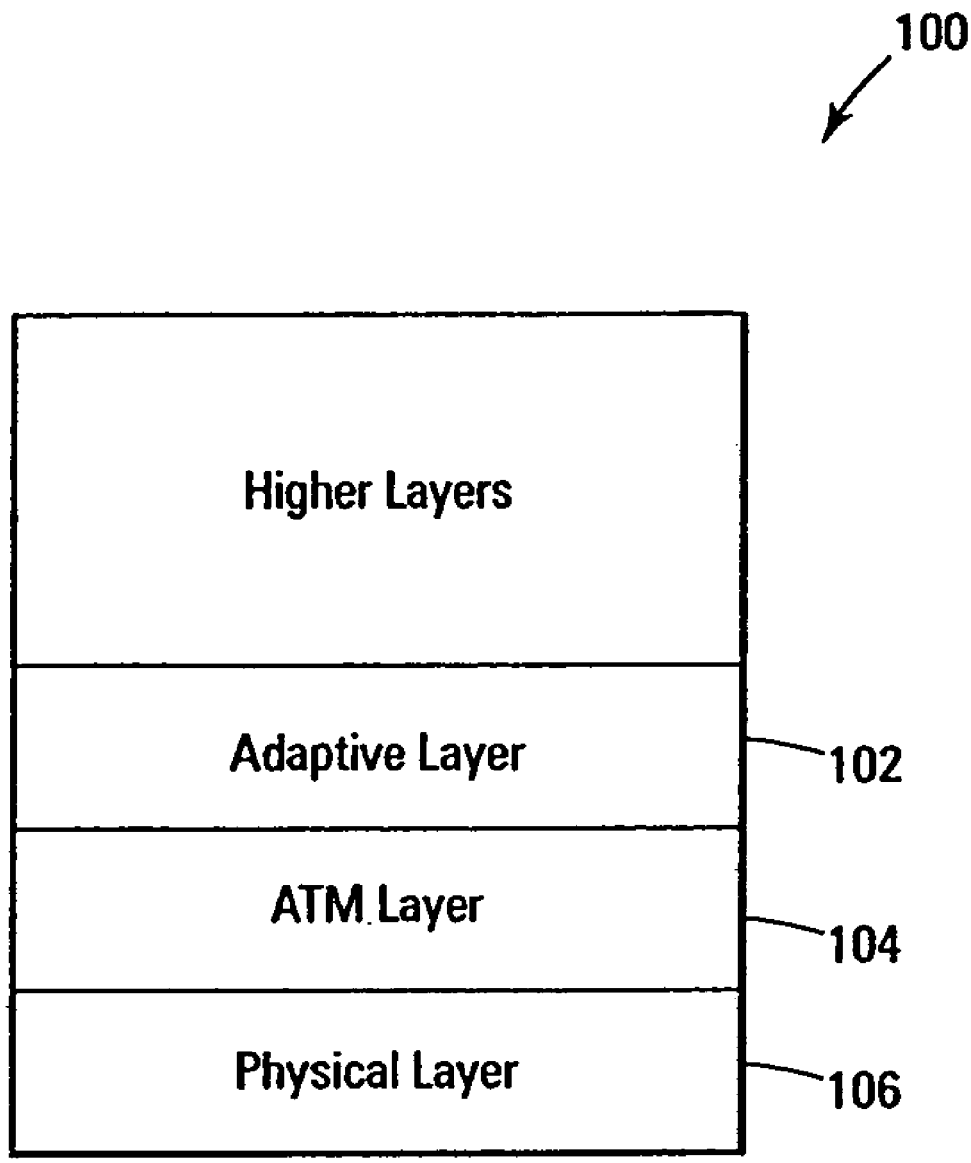
FIG. 1 illustrates a model of an ATM system.

Referring to FIG. 1, a model of an ATM system 100 is described. In general, ATM is a layered architecture allowing multiple services like voice, data and video, to be mixed over a network. Three lower level layers have been defined to implement the features of ATM. An adaptation layer 102 assures appropriate service characteristics and divides all types of data into a 48-byte payload that will make up the ATM cell. An ATM layer 104 takes the data to be sent and adds a 5-byte information header that assures the cell is sent on the right connection. A physical layer 106 defines the electrical characteristics and network interfaces. This layer "puts the bits on a wire."

The physical layer 106 includes a physical medium sub-layer used to communicate the data, and a transmission convergence sub-layer. The physical medium sub-layer provides bit stream transmission capabilities including bit-timing, line-coding and optical/electrical conversion when required. The transmission convergence sub-layer adapts a flow of bits into a flow of cells or vice versa and can be separated into five successive functions: transmission frame generation/recovery; transmission frame adaptation; cell delineation; HEC header sequence generation/verification; and cell rate decoupling.

The next layer in the system is the ATM layer 104, or ATM matrix. This layer transports data passed down to it by the ATM adaptation layer (AAL) 102 to its intended destination. The ATM layer is in charge of routing cells across the network and it's functions are cell multiplexing/de-multiplexing, translation, cell header generation/extraction and at the user network interface (UNI) generic flow control. Thus, the ATM layer is the transport mechanism of the system. As stated above, the ATM cell is 53 bytes long, and 5 of the bytes are reserved for a cell header. The cell header, or overhead, includes a numerical identifier allocating it to a specific connection. The ATM layer uses information received from the AAL layer to generate the ATM header. The AAL layer 102 segments data streams from higher application layers 108 into 48 byte units of information. In the other direction, the AAL layer reassembles data from received ATM cells and passes the data to the higher layers.

The present invention relates to buffer management in an ATM system. In particular, a management system and circuitry is provided to manage variable sized linked lists in a buffer, while handling ATM cells with different priority levels. The following sections provide an overview of the present invention and detailed descriptions of the circuitry and operation of components of the present invention.

Figure 2:
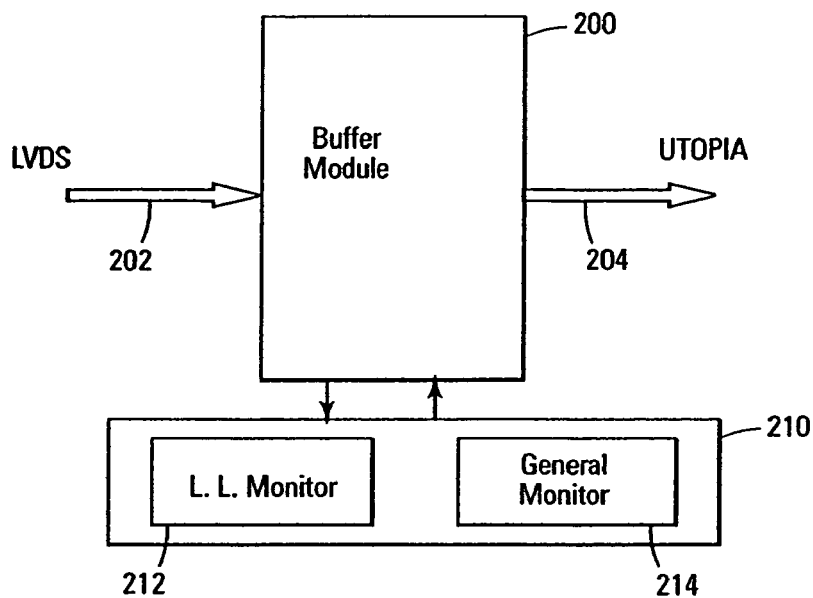
FIG. 2 illustrates a block diagram of an ATM buffer and management system of one embodiment of the present invention.

Referring to FIG. 2, a block diagram is provided of an ATM buffer 200 and management system 210 of one embodiment of the present invention. The buffer 200 is coupled between a low voltage differential signal (LVDS) bus 202 and a UTOPIA bus 204 in an ATM network. The remaining ATM system components are not illustrated in FIG. 2 for simplicity.

A buffer management system 210 is coupled to the ATM buffer 200. The buffer management system includes a linked list monitor 212 and a general buffer monitor 214. The linked list monitor 212 and the general buffer monitor 214 are described in greater detail below. The linked list monitor 212 is configurable to correspond to a port and priority configuration of the ATM buffer. The general buffer monitor 214 keeps track of the buffer operation as a whole, regardless of the port and priority configuration of the ATM buffer.

As known to those skilled in the art, a linked list is a list of data that includes an identifier, or link, to another location in the list. Thus, a sequence of data packets can be stored in non-consecutive locations in a storage medium. While reading a first data packet, the location of a subsequent data packet is determined. The present invention provides a hardware management system for a linked list buffer.

Figure 3:
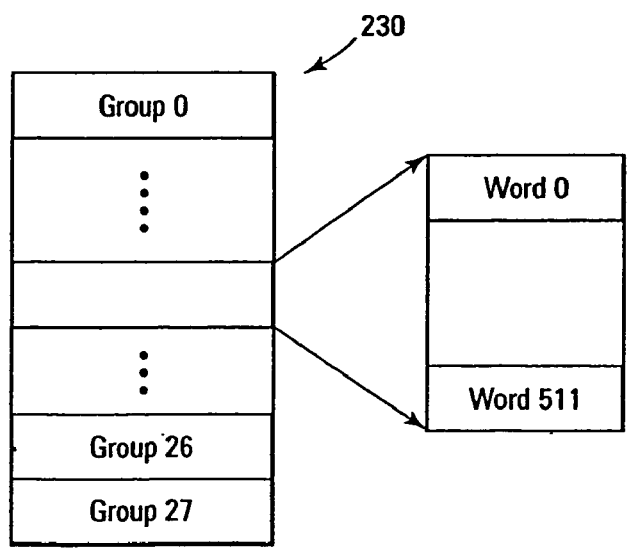
FIG. 3 illustrates a linked list buffer architecture that is organized into 27 groups.

FIG. 3 illustrates a linked list buffer 230 architecture that is organized into 27 groups. Each group can store up to 512 16-bit words. Thus, the buffer can logically be divided to form up to 16 linked lists. This can be visualized as a buffer that has 16 columns and 512 rows, where the linked lists are arranged to extend down the columns. Because each group can store 512 words, an ATM cell can be stored in each group. Group 0 is used to store the first word of the ATM header of each ATM cell inserted into the buffer. Group 26 stores the last data word of each of the inserted ATM cells, and Group 27 stores the next pointer to indicate the address of the next cell with the same linked list number.

Linked List Overview

The following is a description of a prioritized linked list of the present invention. The prioritized linked list can be part of an Asynchronous Transfer Mode (ATM) matrix Application Specific Integrated Circuit (ASIC), also referred to herein as an ATMX. The ATMX is comprised of four basic functional blocks: Universal Test and Operations Interface for ATM (UTOPIA) bus interface, Linked list buffer, Switching and header translation, and low voltage differential signal line (LVDS) ports. The main function of the ATMX is to convert ATM cells received at the UTOPIA bus interface, by either an ATM switch or ATM based service cards, into a serial bit stream and transmit them via one or more of the LVDS ports, and visa versa. The ATMX consists of two data paths: UTOPIA to LVDS and LVDS to UTOPIA. The linked list buffer interfaces between the LVDS ports and the UTOPIA interface in the LVDS to UTOPIA path. The function of the linked list buffer is to correlate a data rate between a fast data rate of the LVDS port and a slower data rate of the UTOPIA bus. In the UTOPIA to LVDS path, the UTOPIA bus interface and LVDS ports are interfaced by a switching and header translation block. The ATMX can be configured to work in one of two main modes of operation that is determined by the location of the ATMX in the data path of the ATM cells. The UTOPIA bus interface of the ATMX can be positioned opposite an ATM switch or opposite ATM based service cards. In the first case, the ATMX serves as a UTOPIA bus slave (the ATM switch is the master) and in the second case, the ATMX UTOPIA interface is master of the UTOPIA bus. In both cases a differentiation between two data paths needs to be made: downstream path and upstream path.

The downstream path is the flow of data directed from the ATM switch to the ATM service cards and the upstream path is from the ATM service cards to the ATM switch. In the downstream path the ATMX can work in two modes. In the first mode, the ATMX can service up to sixteen different UTOPIA addresses. In the second mode the ATMX services up to eight different physical addresses (PHYs), where each PHY supports two types of ATM cells: Constant Bit Rate (CBR) cells and Unspecified Bit Rate (UBR) cells. The two types of cells are differentiated by the CDP bit in the ATM cell header. The PHY number is determined by a four bit address field in the ATM cell header.

In the upstream data path the ATMX supports three modes of operation. In the first mode the ATM cells are not divided into groups. In the second mode the ATM cells are divided into two groups: UBR and CBR (selected by the CDP bit in the ATM cell header). In the third mode the ATM cells are divided into ten groups. The group number is determined by the LVDS port that the cell was received in. In both upstream and downstream data directions in both modes the ATM cells are divided into two Cell Loss Priorities (CLP): High priority and low priority.

The linked list buffer, in one embodiment, supports up to sixteen individual linked lists. The ATM cells received from the LVDS ports are stored in the linked list buffer until they are transmitted via the UTOPIA bus. Each ATM cell address (either PHY address or LVDS port number) corresponds with a linked list in the linked list buffer, thus supporting up to sixteen PHYs in the downstream path and up to ten in the upstream path (ten LVDS ports). When the ATMX is in the UBR/CBR mode, each address is divided into two linked lists: one for UBR cells and one for CBR cells. Thus, up to eight different PHYs are enabled in the downstream path or two in the upstream path.

The linked list buffer is divided into four functional blocks: state machines, link list monitoring, linked list logic and memory (buffer). The state machines can be divided into two groups: insertion and extraction. There are two state machines on the insertion side. A first insertion state machine (SM0) scans the LVDS ports for an ATM cell. Once found, the state machine signals a second insertion state machine (SM1) that a cell has been found. SM1 reads the cell data from the LVDS port First-In First-Out (FIFO) memory and writes (inserts) the data in the buffer. The extraction side includes two state machines as well. The first extraction state machine (SM3) receives a requested PHY or LVDS port number from the UTOPIA bus interface and produces a "grant" signal to the UTOPIA interface if an ATM cell of the requested port number is in the buffer, or a "reject" signal if not. If an ATM cell exists in the buffer then SM3 signals the second extraction state machine (SM2) to start extracting the ATM cell from the buffer and the port number of the cell to be extracted. SM2 reads (extracts) the cell data from the buffer and writes it to the UTOPIA bus interface FIFO.

As explained below, one embodiment of the monitoring block comprises 22 counters. The counters include sixteen 9-bit counters, one for each linked list. These 9-bit counters count the number of cells that are in the buffer, per linked list. Another 9-bit counter is provided that counts the total number of cells in the buffer. Two 9-bit counters are included that count the total number of UBR cells and the total number of CBR cells in the buffer. A 16-bit counter is provided to count the total number of cells discarded from the buffer because they were of low CLP. A second 16-bit counter counts the total number of cells discarded from the buffer because the number of cells in a linked list reach the overflow threshold. Finally, a 32-bit counter is provided to count the total number of cells that are received by the LVDS ports (received and discarded). SM1 increments the appropriate counters when receiving a cell, and SM2 decrements the appropriate counters when extracting a cell from the buffer.

There are 38 thresholds in the monitoring block intended to prioritize specific ATM cells over others. There are two thresholds per linked list (total of 32) that are designed to limit the number of cells in the buffer per linked list. The first threshold is the linked list CLP threshold. Once the number of cells in the linked list reach the CLP threshold, any cell received (for the specific linked list) with a low CLP is discarded. The second threshold is the linked list overflow threshold. Once the number of cells in the linked list reach the overflow threshold, all cells for the specific linked list are discarded.

The UBR counter has two thresholds: a CLP threshold, and an overflow threshold. Once the number of UBR cells in the buffer reach the CLP threshold, any UBR cell received with a low CLP is discarded. Likewise, once the number of UBR cells in the buffer reach the overflow threshold, all UBR cells received are discarded.

The CBR counter has the same thresholds as the UBR counter. The counter that counts the total number of cells in the buffer has two thresholds: One CLP threshold (same as linked list, UBR and CBR CLP thresholds). And one backpressure threshold, once reached a backpressure flag is raised.

The linked list logic comprises 16 registers that indicate the location of the first cell of each linked list in the buffer, 16 registers that indicate the location of the last cell of each linked list in the buffer, a FIFO memory that indicates the next available location in the buffer for inserting a cell and multiplexers to enable writing the location of the next cell of the linked list at the previous cell location. A memory is provided that can be a Dual Port RAM (DPR) 14K (14× 1024) deep, 16-bit wide. The memory can store a total of 512 56-byte long ATM cells. SM1 (insertion state machine) controls the insertion address counter, insertion address MUXes and the insertion data MUXes. SM2 (extraction state machine) controls the extraction address counter.

EXAMPLE EMBODIMENTS

Figure 4:
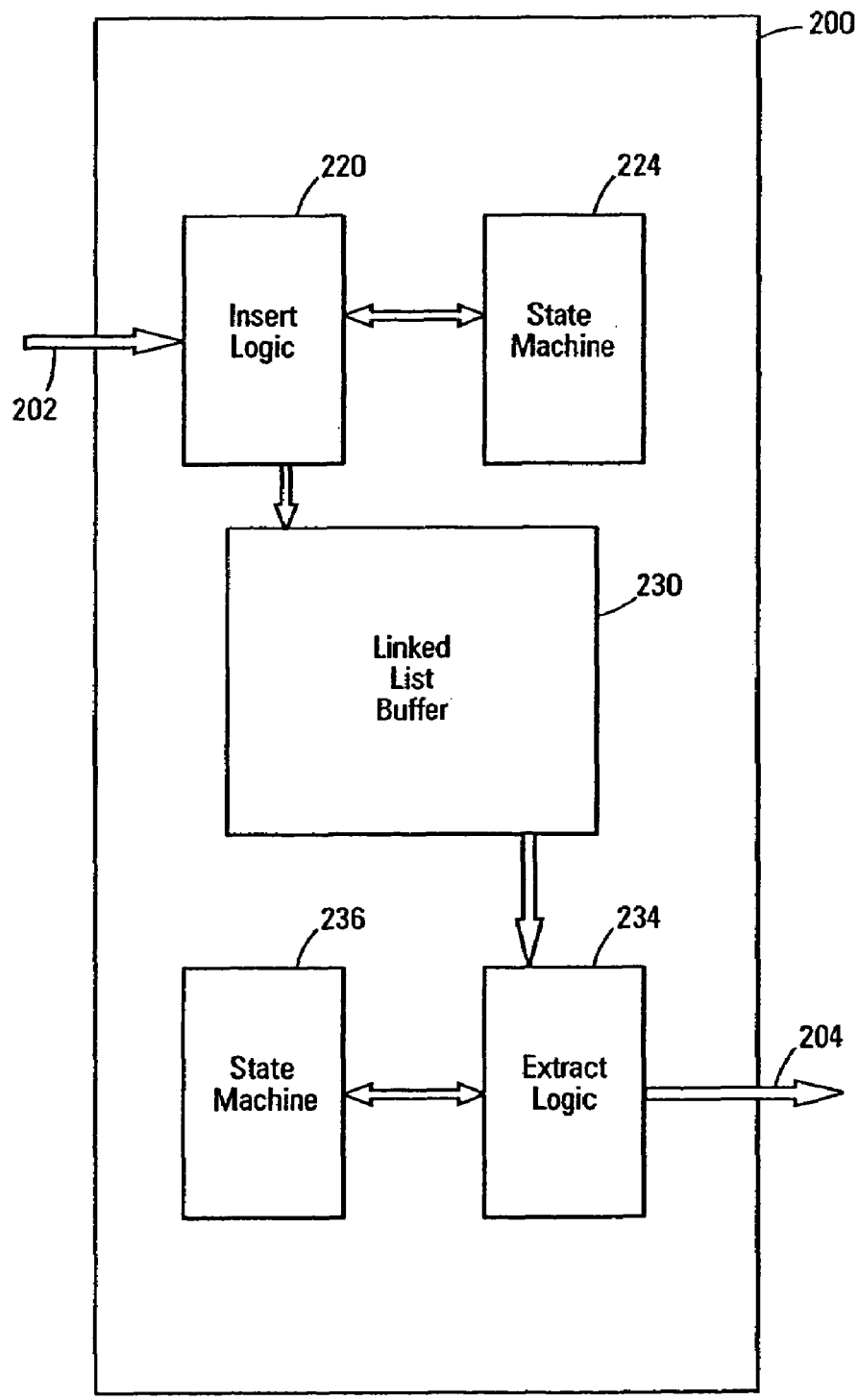
FIG. 4 is a more detailed block diagram of a buffer of one embodiment of the present invention.

Referring to FIG. 4, linked list buffer 200 circuitry includes insert logic 220 that takes an ATM cell from a selected LVDS port and stores it in the buffer 230 in connection with a previous ATM cell received on the same linked list. The linked list numbering is explained in detail below. A first state machine 224 is provided to control the operation of the insert logic 220. The linked list buffer 200 also includes extraction logic 234 that takes ATM cells from selected linked lists and outputs the ATM cells to the UTOPIA interface. A second state machine 236 is coupled to control the operation of the extraction logic 234.

Figure 5:
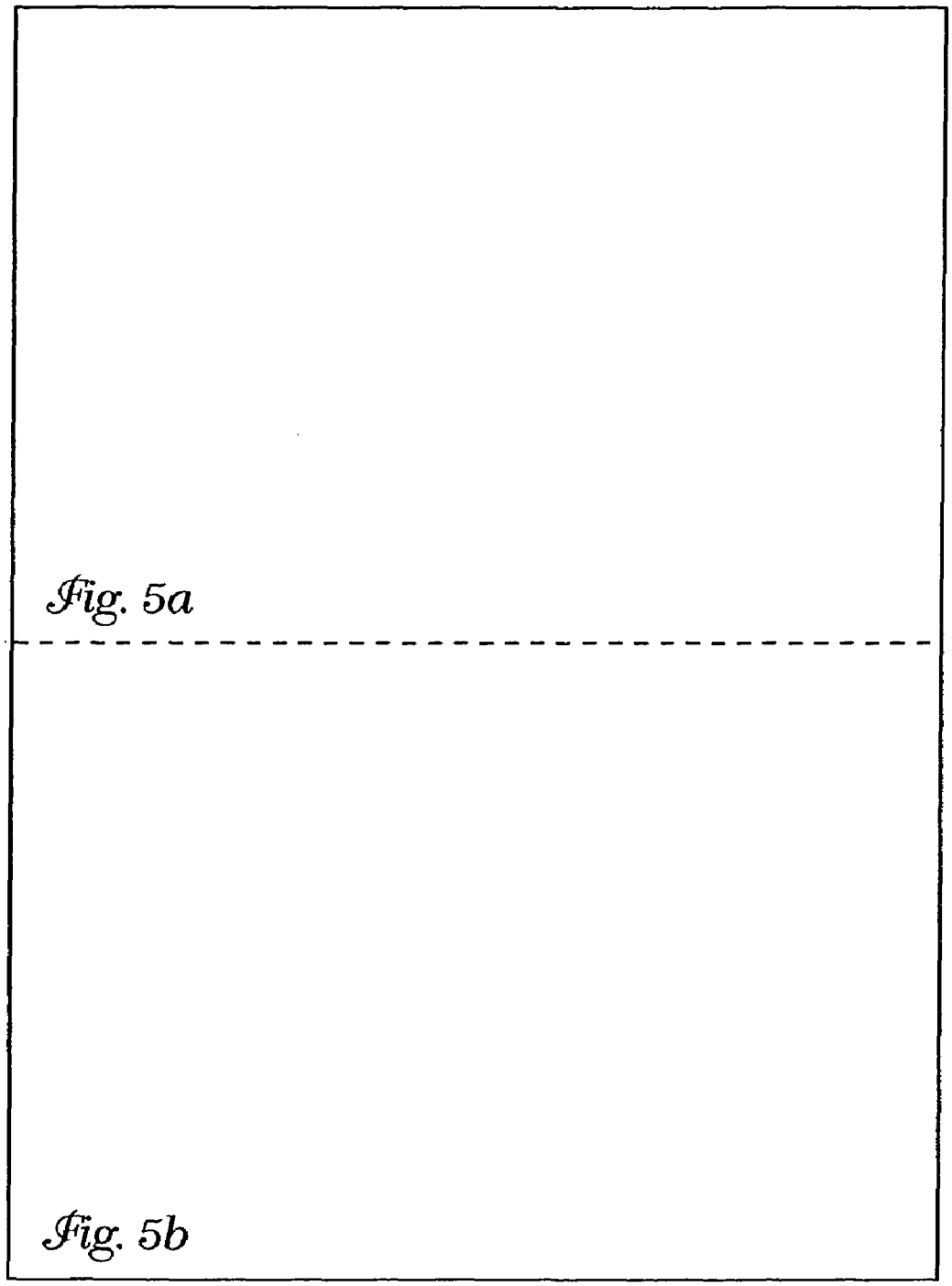
FIGS. 5a and 5b are detailed diagrams of one embodiment of the linked list buffer monitor.
Figure 5A:
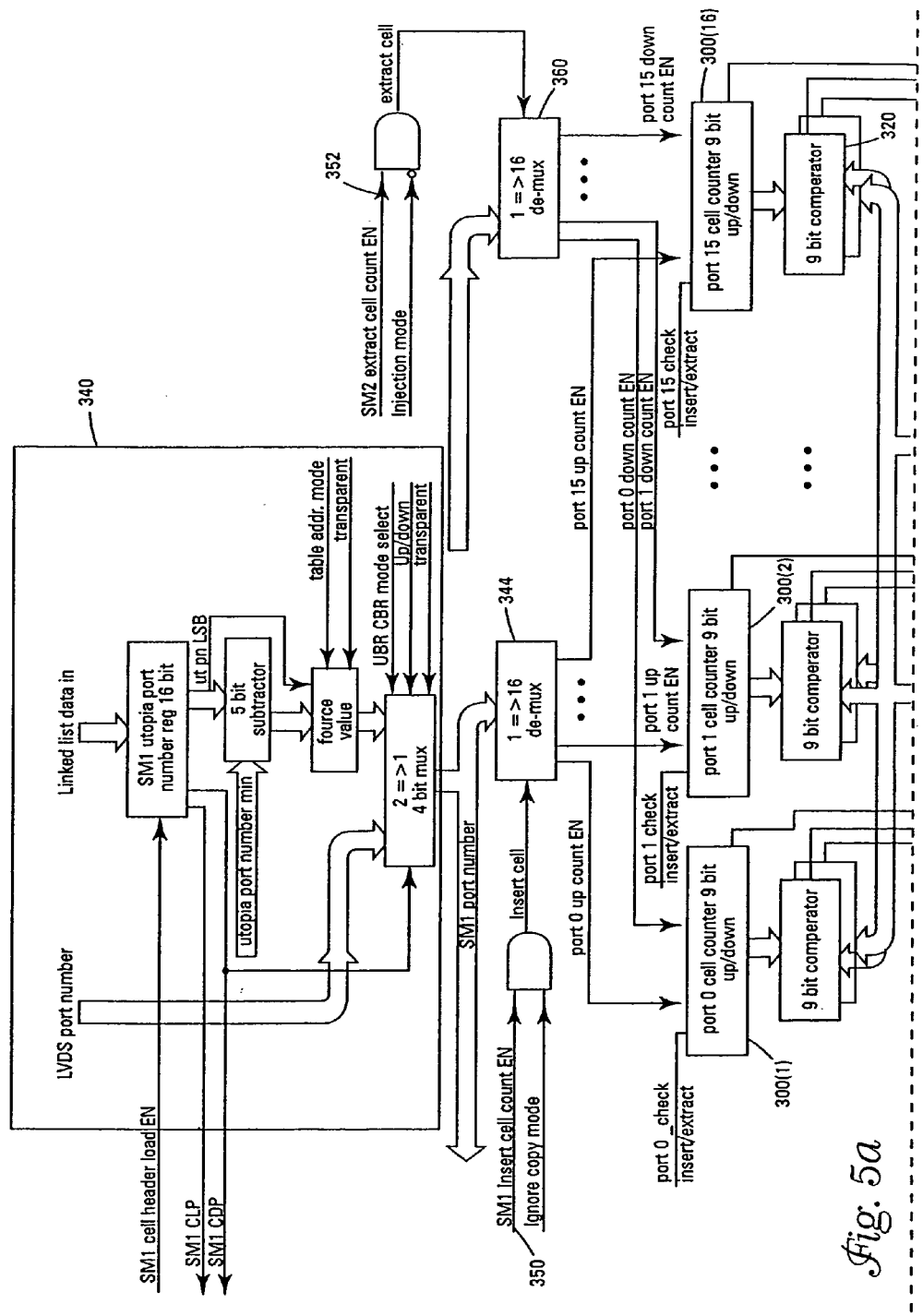
Figure 5B:
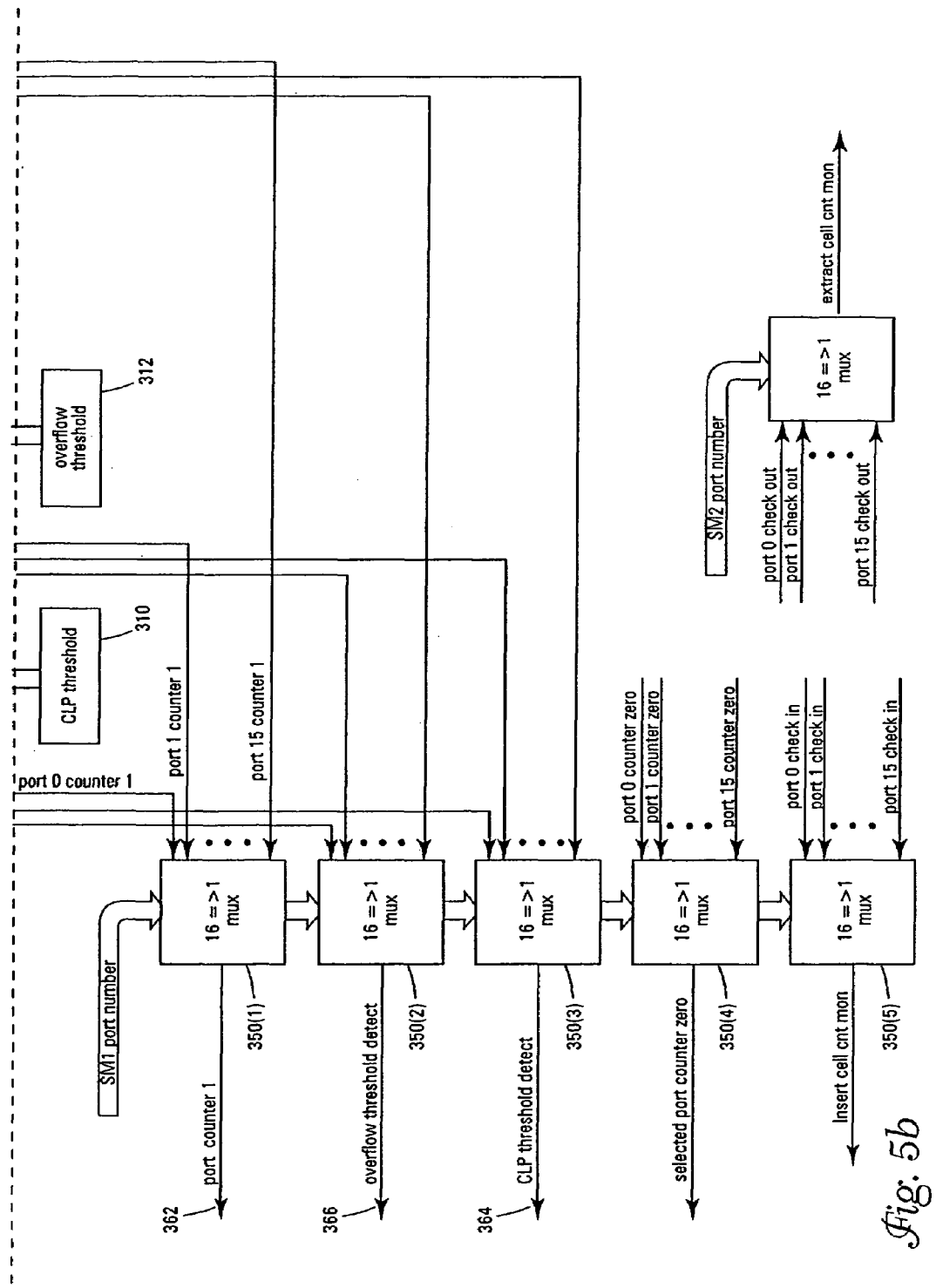

Referring to FIGS. 5a and 5b, a detailed diagram of one embodiment of the linked list buffer monitor 212 is described. The link list monitor 212 includes up/down counter circuits that have adjustable counting thresholds.

The first and second state machines that control the insert and extract logic, respectively, also control the linked list monitor. The insert logic state machine is used to increment the counters and the extract logic state machine is used to decrement the counters. Thus, the counters keep track of the size of each linked list contained in the buffer 230.

The buffer 230 can be configured, in one embodiment, to operate in one of five specified modes. The five modes provide either one, two, eight, ten or sixteen linked lists. The operation of the linked list monitor will vary depending upon the operating mode of the buffer, as explained below.

The linked list monitor 212 includes sixteen nine-bit counters 300(1)–300(16). The nine bits of the counters allows each counter to count up to the 512 cell capacity of the buffer. Each counter can be used to monitor one linked list and has two software configurable thresholds. A first threshold is a cell loss priority (CLP) threshold 310 that determines if a number of cells in the linked list exceeds a threshold based upon a priority status of the list. If a length of a linked list exceeds the CLP threshold, non-priority cells are not accepted. That is, space is reserved for priority cells in the linked list, and non-priority cells are dumped from the LVDS port.

The second threshold is an overflow threshold 312 that determines if a number of cells exceeds a maximum allowed length of a linked list. Because the cell capacity of each linked list varies depending upon the configuration of the buffer, the overflow threshold is established for the sixteen counters based upon the buffer configuration. Further, the CLP threshold is programmed based upon the size of the linked list being monitored and the priority of the ATM cells. If either the overflow or CLP thresholds are violated, counters in the general monitor are incremented, as explained below. The two threshold values are compared to the counter values using compare circuits 320.

The linked list monitor is LVDS port based. That is, a port number circuit 340 is used to determine a counter number for the monitor. The mode of operation, the cell overhead CDP bit, and the designation UTOPIA port number are also used to determine the counter number. The counter number is coupled to a 1:16 demultiplex circuit 344. The demultiplex circuit 344 is controlled by the insert logic state machine 224, via an insert cell signal 350, to increment a count of one of the counters 300. The count value of the counter is then compared to the overflow and CLP thresholds. The port number is also coupled to numerous multiplex circuits 350(1)–350(5) to provide feedback to the state machine. A first multiplex circuit 350(1) provides a port counter bit. A second multiplex circuit 350(3) provides a data bit indicating if the CLP threshold was violated, and a third multiplex circuit 350(2) provides a data bit indicating if the overflow threshold was violated.

If a cell is extracted from the linked list, the port number is used to control a second demultiplex circuit 360. An extract cell signal 352 is coupled to the demultiplex circuit to decrement a selected counter in response to the extract logic state machine 236. The extract logic state machine 236 receives the port counter bit 362, as explained below.

The port counter bit can be either logic one or a logic zero. When the port counter bit is logic zero, the state machines update linked list pointers. Further, the port counter bit indicates that a cell is waiting to be extracted. The port counter bit is logic one when a race between the insert and extract state machines is identified. This can occur when the state machines are working on the same list and the list contains one cell.

The CLP data bit 364 indicates that a current cell is to be dumped from the LVDS port and a CLP counter should be incremented. Likewise, the overflow data bit 366 indicates that a current cell is to be dumped from the LVDS port and the overflow loss counter should be incremented.

When the buffer is configured as one list without cell priority, the first counter 300(1) is used exclusively. Thus, the first counter is incremented and decremented, respectively, with the insertion and extraction of cells. When the buffer is configured to have two lists (one with priority), the linked list port is set to "0000" if the cell delay priority (CDP) bit is "0" and the linked list port is set to "1000" if the CDP is a "1" indicating that the cell is a delay priority cell. In this mode, the first and eighth counters 300(1) and 300(8) are monitoring the two buffer lists. The first counter 300(1) monitors the non-priority cell list (UBR), and the eighth counter 300(8) monitors the priority cell list (CBR).

When the buffer is configured as ten lists with priority, the first ten counters 300(1) to 300(10) operate according to the LVDS port number from which the currently processed cell was received. The buffer can be configured to have sixteen linked lists. In this embodiment, the sixteen counters 300(1) to 300(16) monitor the lists. If the buffer is configured as eight lists with priority, all of the counters are used. The first eight counters 300(1) to 300(8) monitor the UBR cells and the remaining eight counters 300(9) to 300(16) monitor the CBR cells.

In summary, the buffer can be configured to store a number of different priority and non-priority linked lists. The linked list monitor includes a number of counters that can be configured to correspond to the configuration of the buffer. Overflow and CLP thresholds for the counters can be changed using software to match the configuration of the buffer and counters. As stated above, the monitor circuitry includes a general linked list monitor circuit 214 that is used to monitor the CBR and UBR cells. A detailed description of one embodiment of the general monitor follows.

Figure 6A:
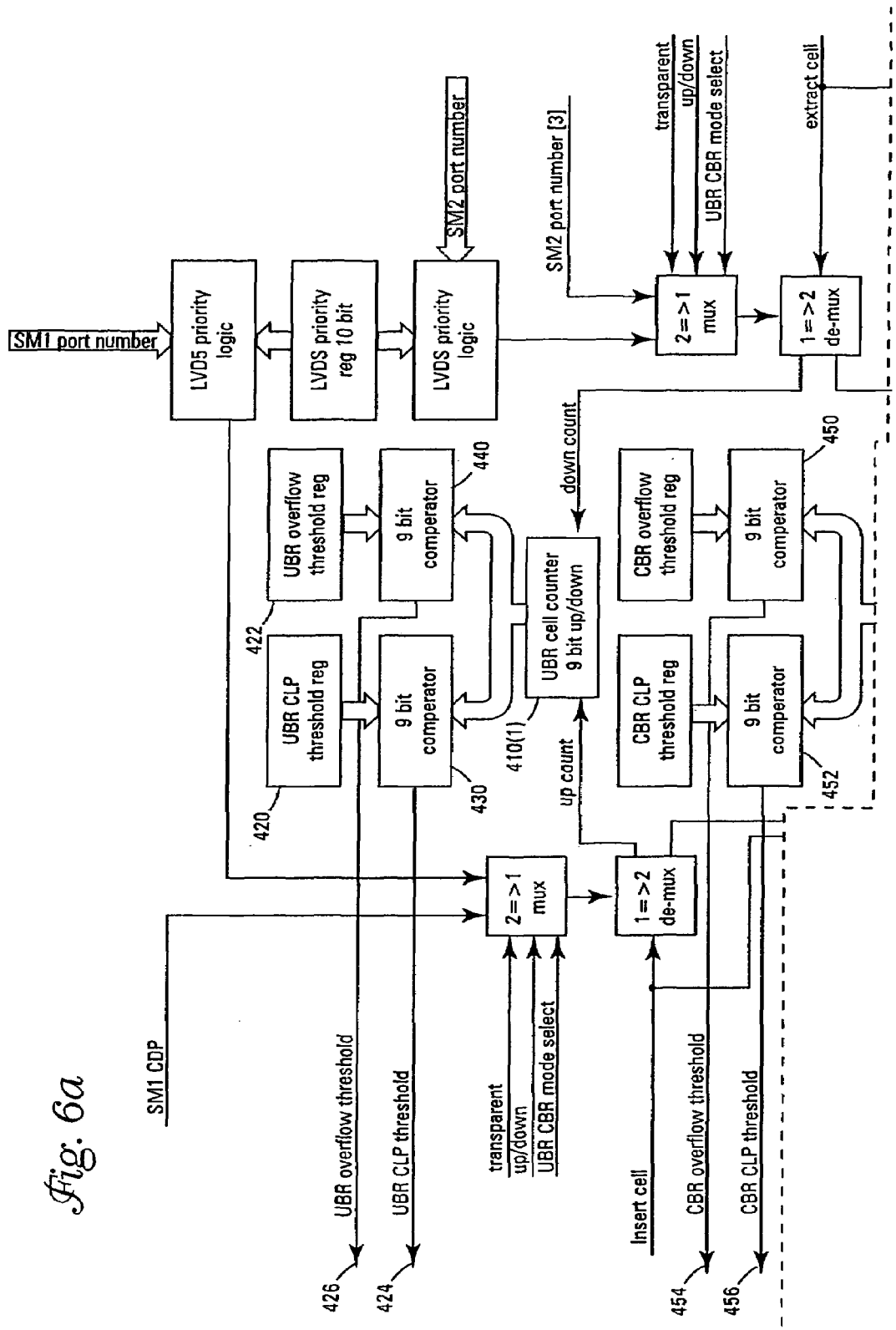
FIGS. 6a and 6b show one embodiment of a general linked list buffer monitor of the present invention.
Figure 6B:
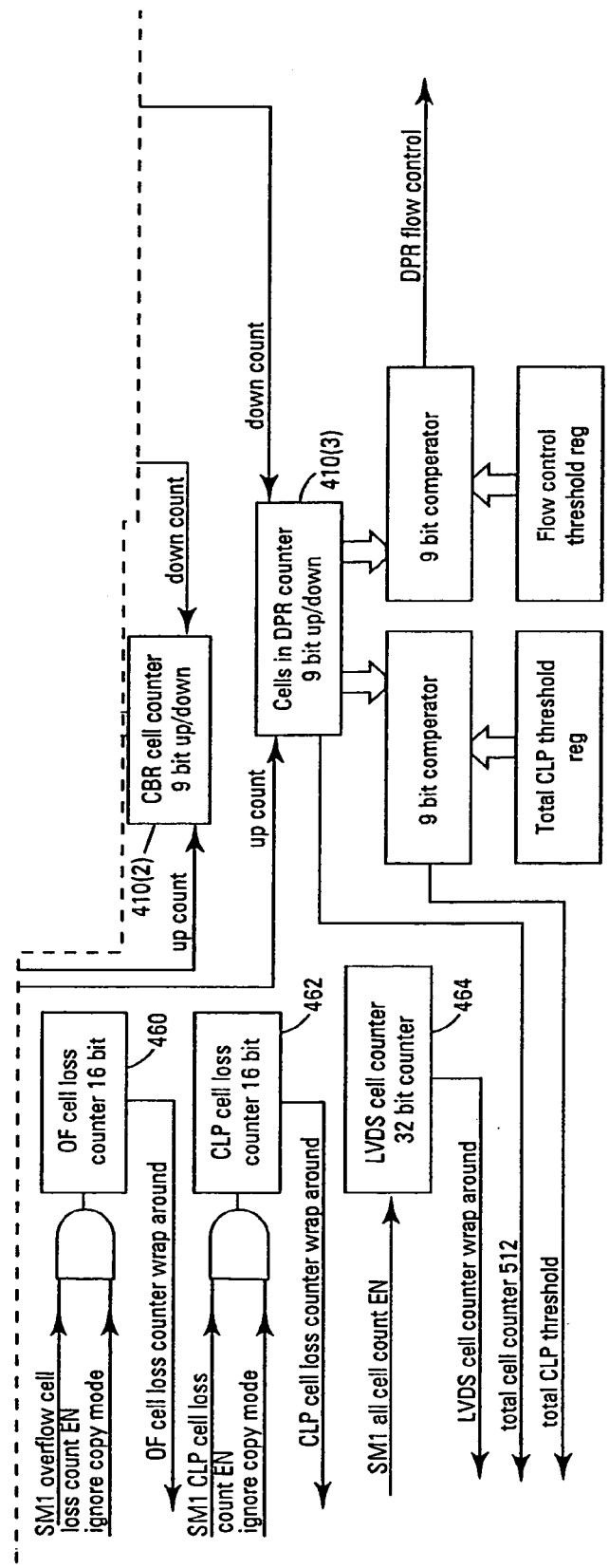
Figure 7:
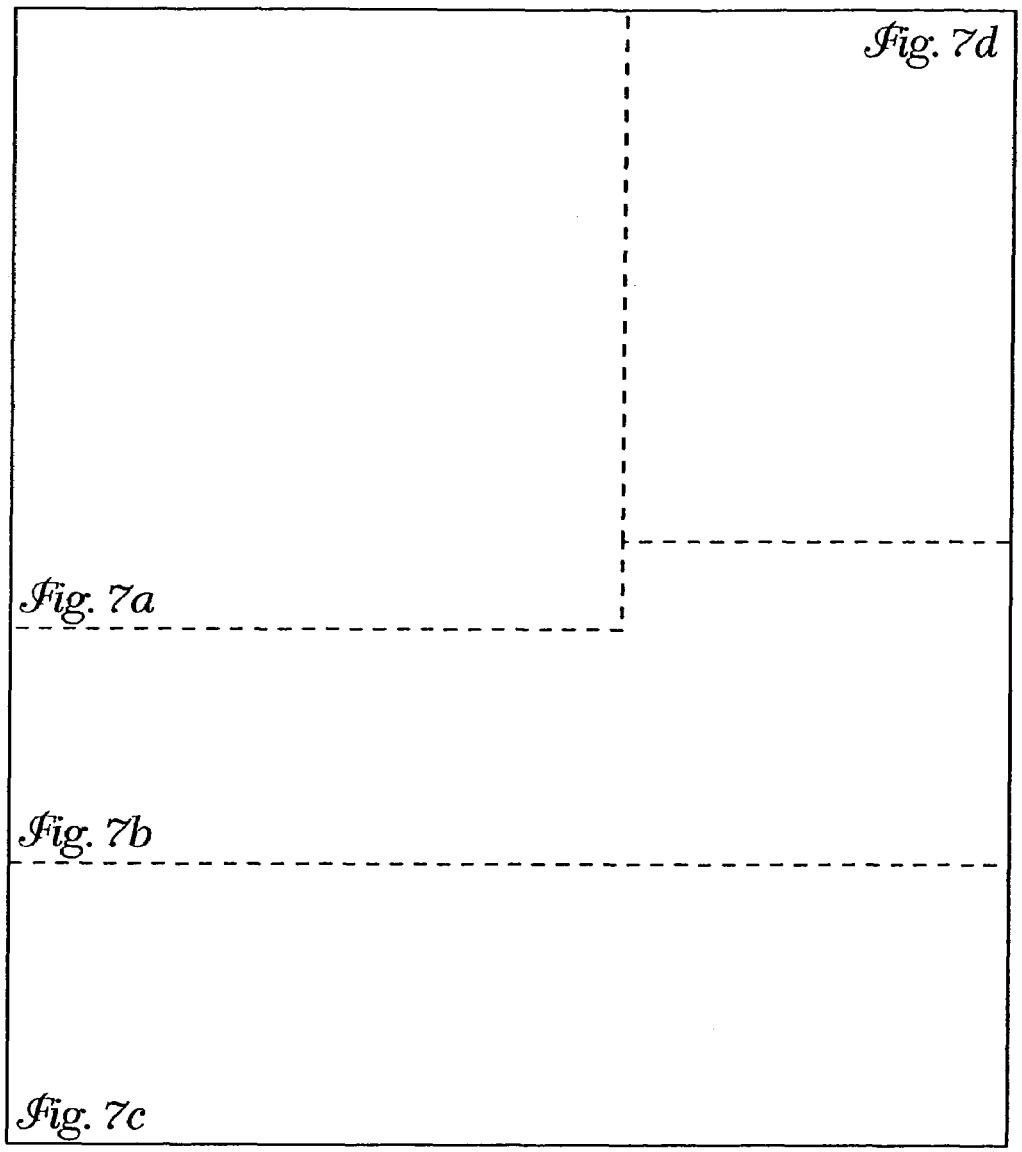
FIGS. 7a, 7b, 7c and 7d illustrate one embodiment of an insert state machine of one embodiment of the present invention.
Figure 7A:
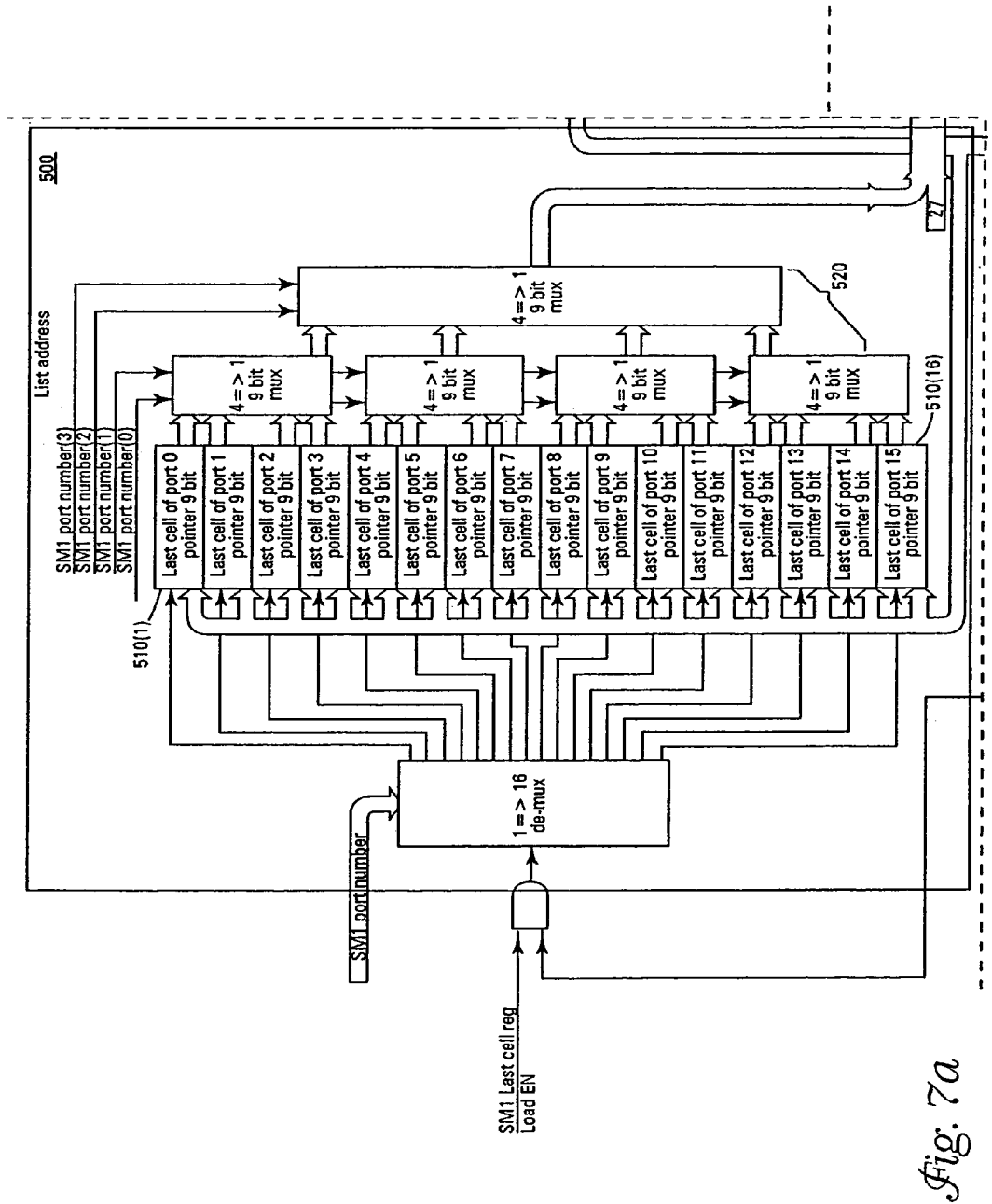
Figure 7B:
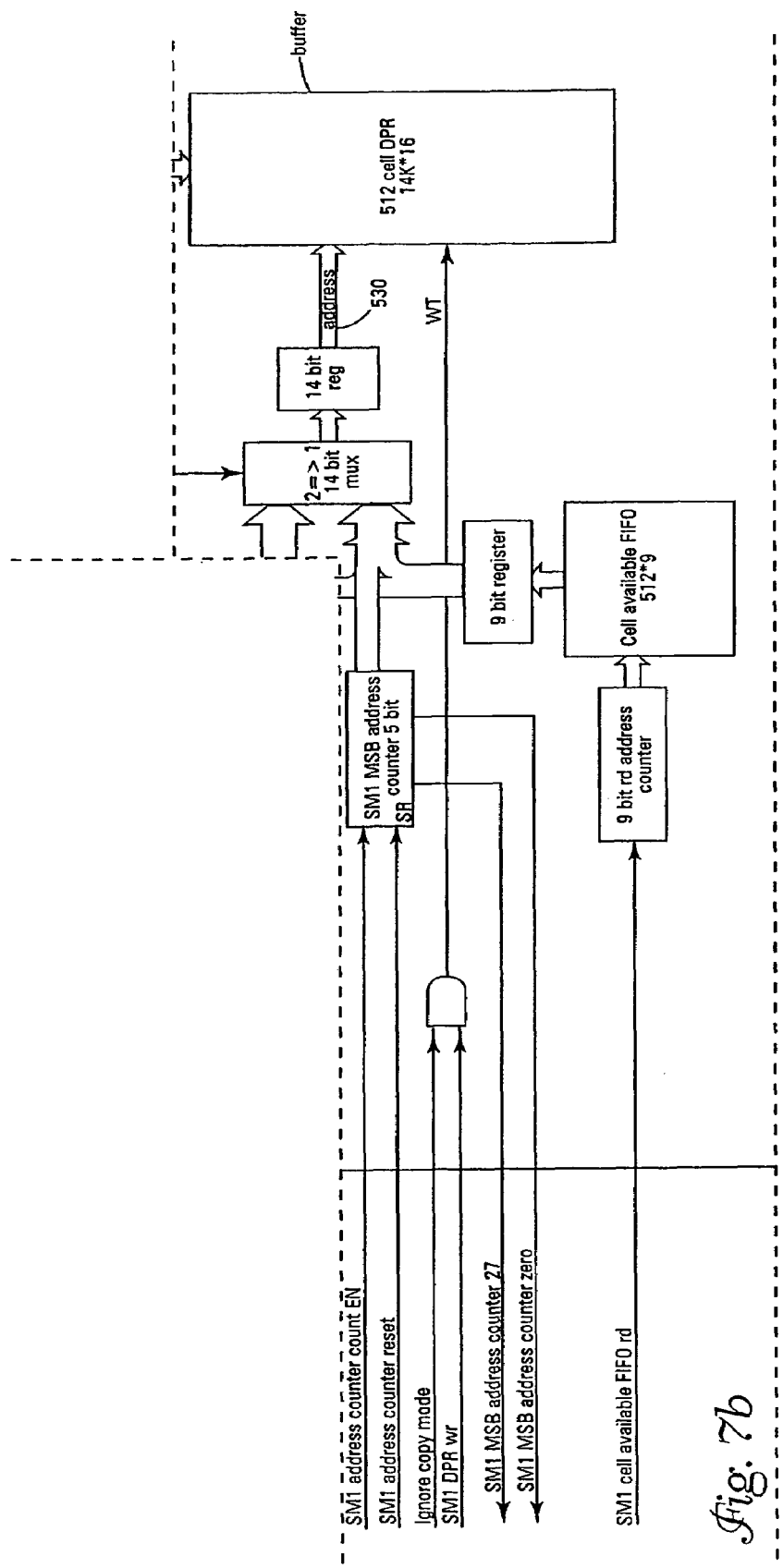
Figure 7C:
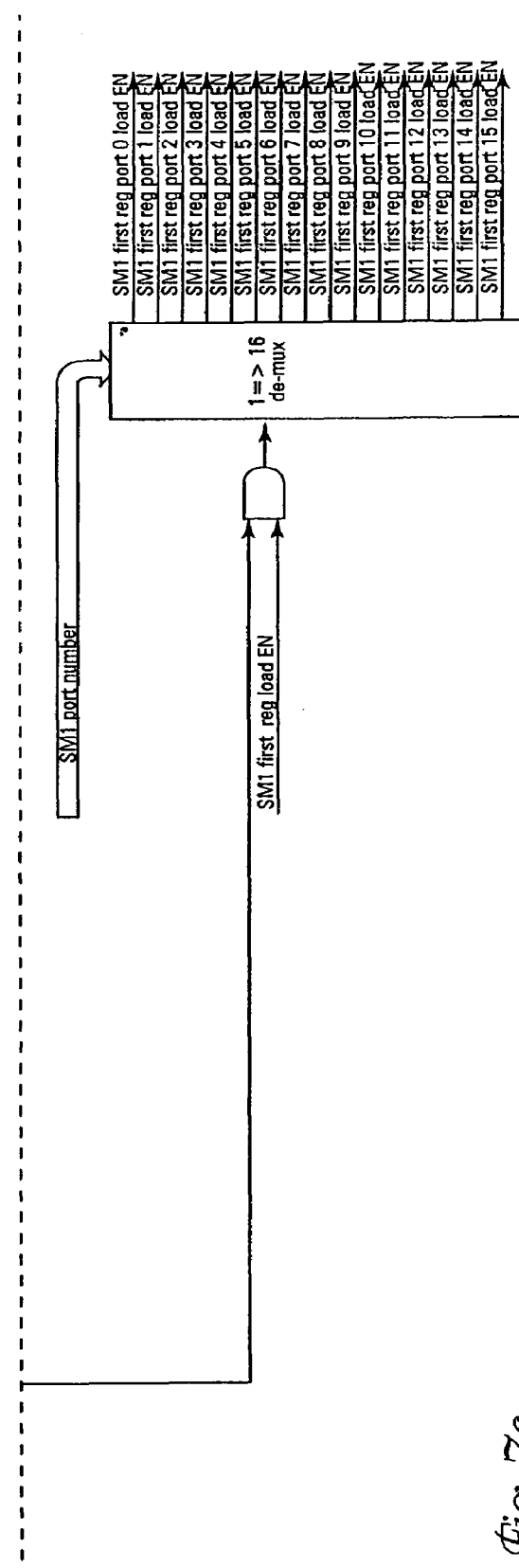
Figure 7D:
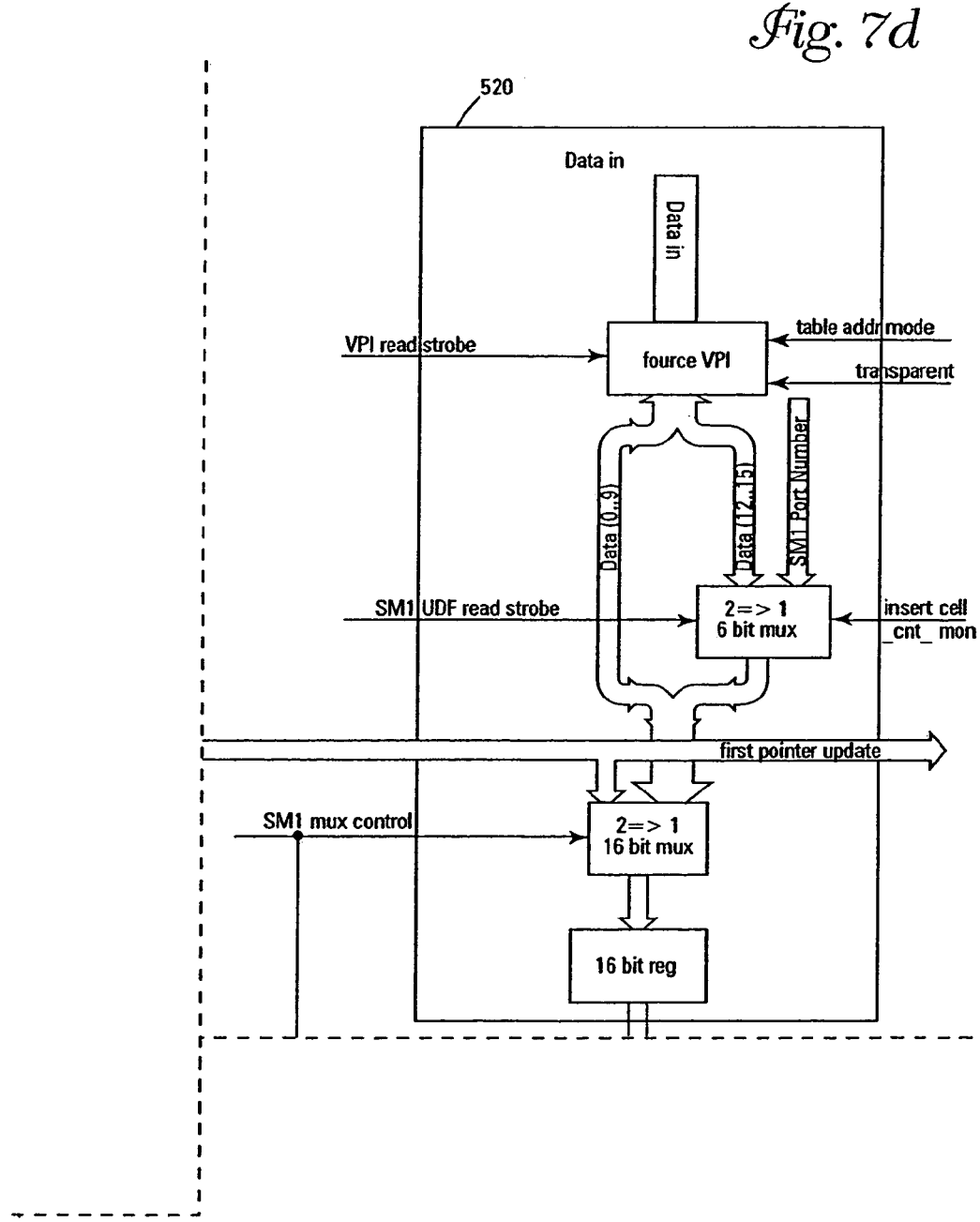
Figure 8:
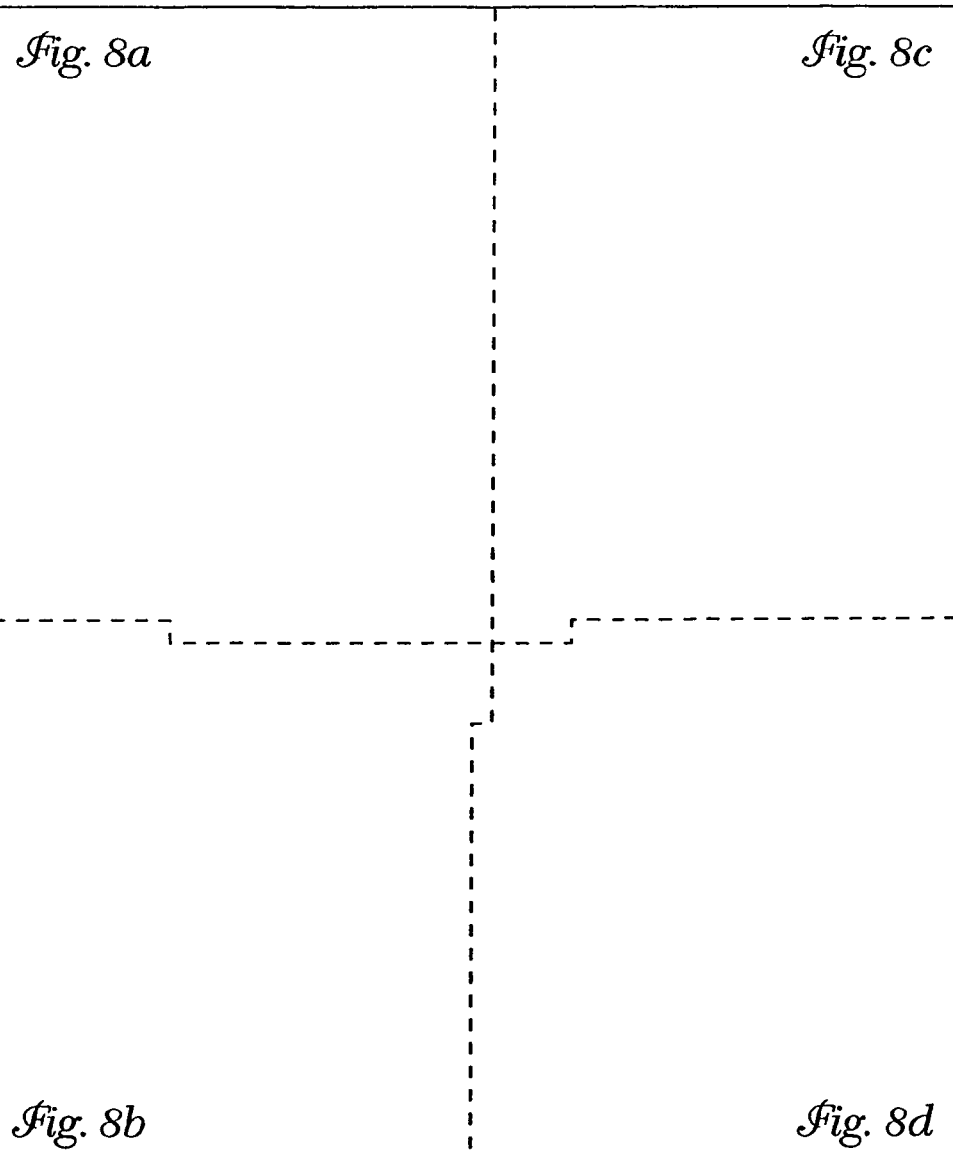
FIGS. 8a, 8b, 8c and 8d illustrate one embodiment of a cell extraction state machine.
Figure 8A:
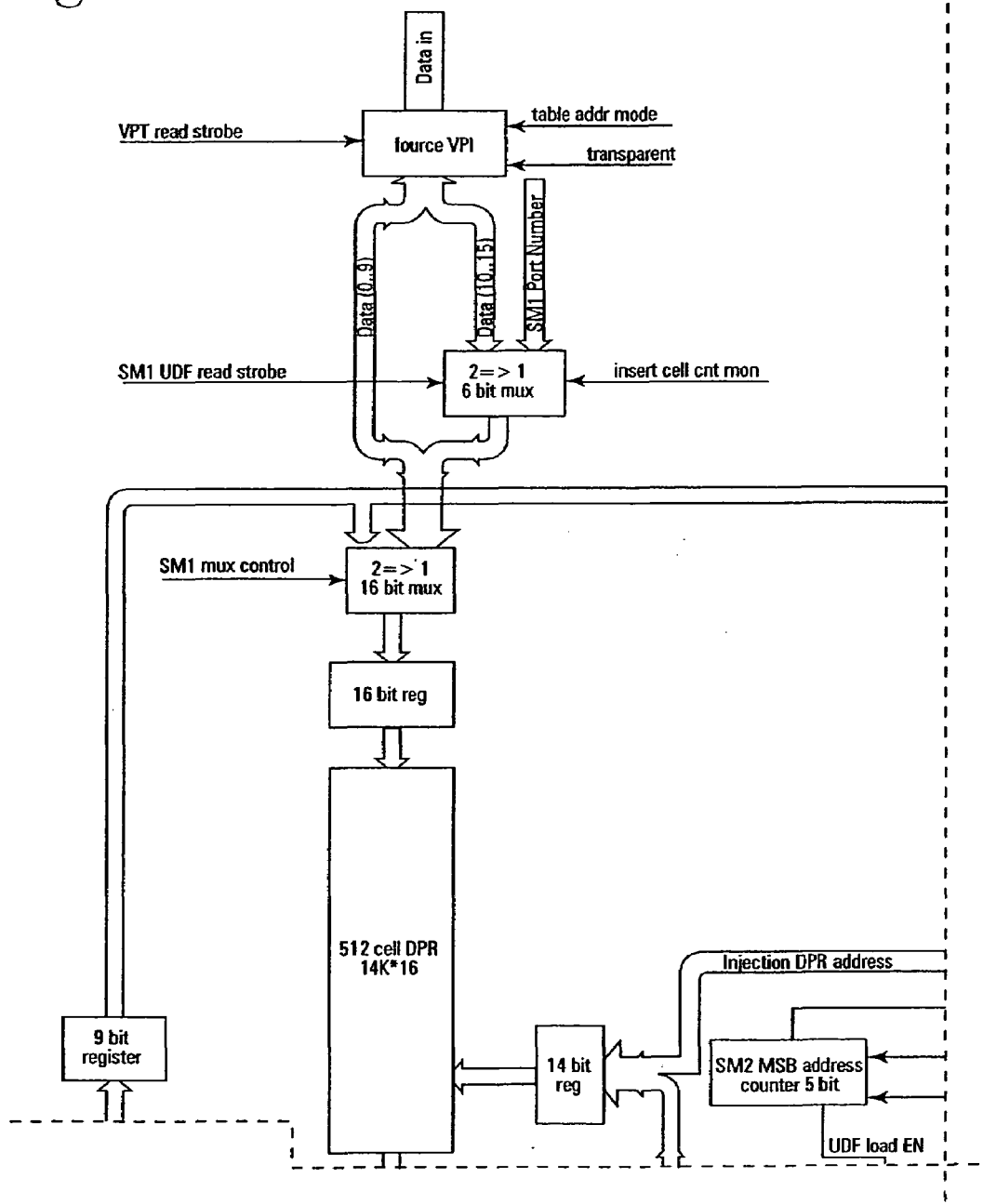
Figure 8B:
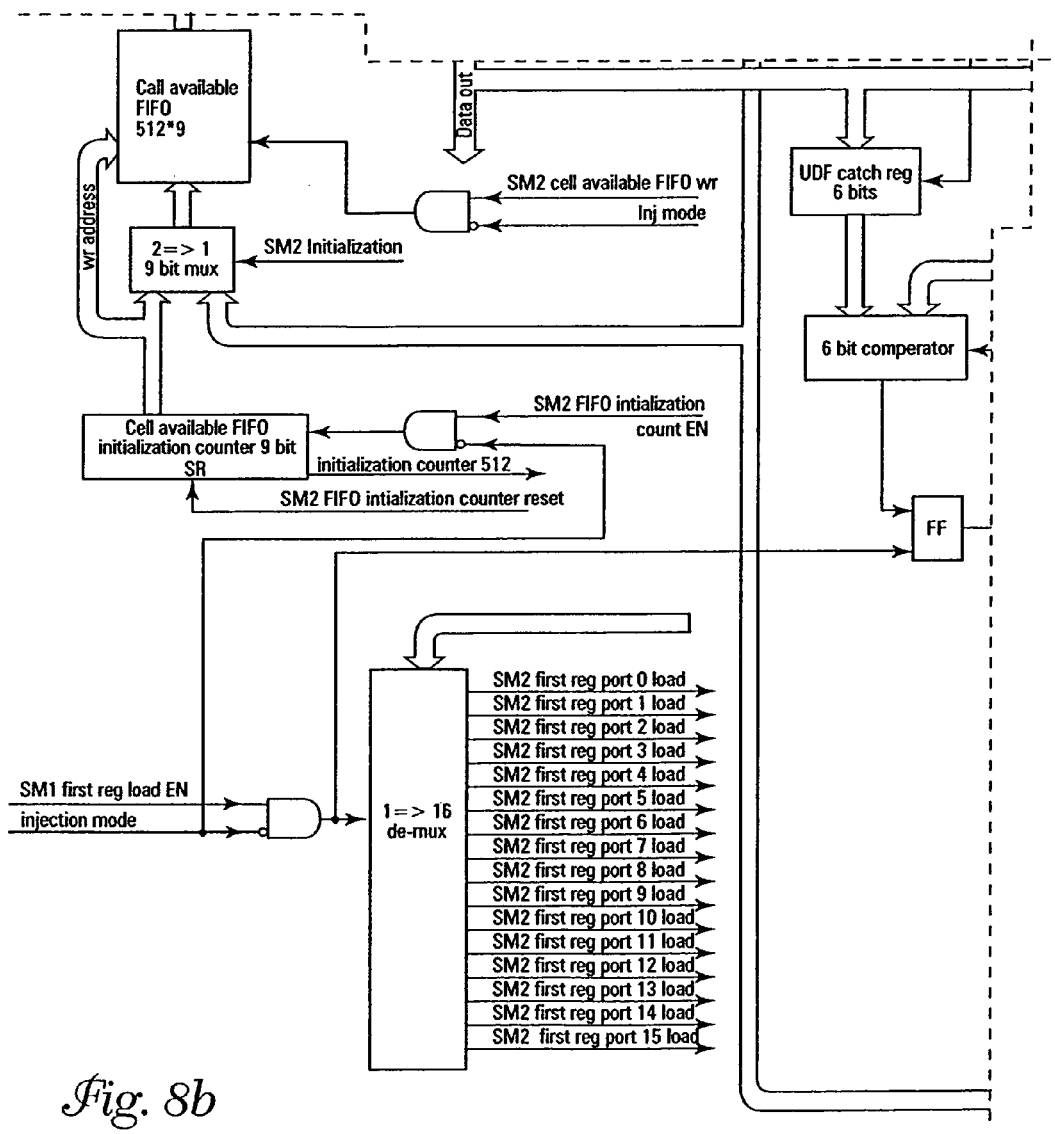
Figure 8C:
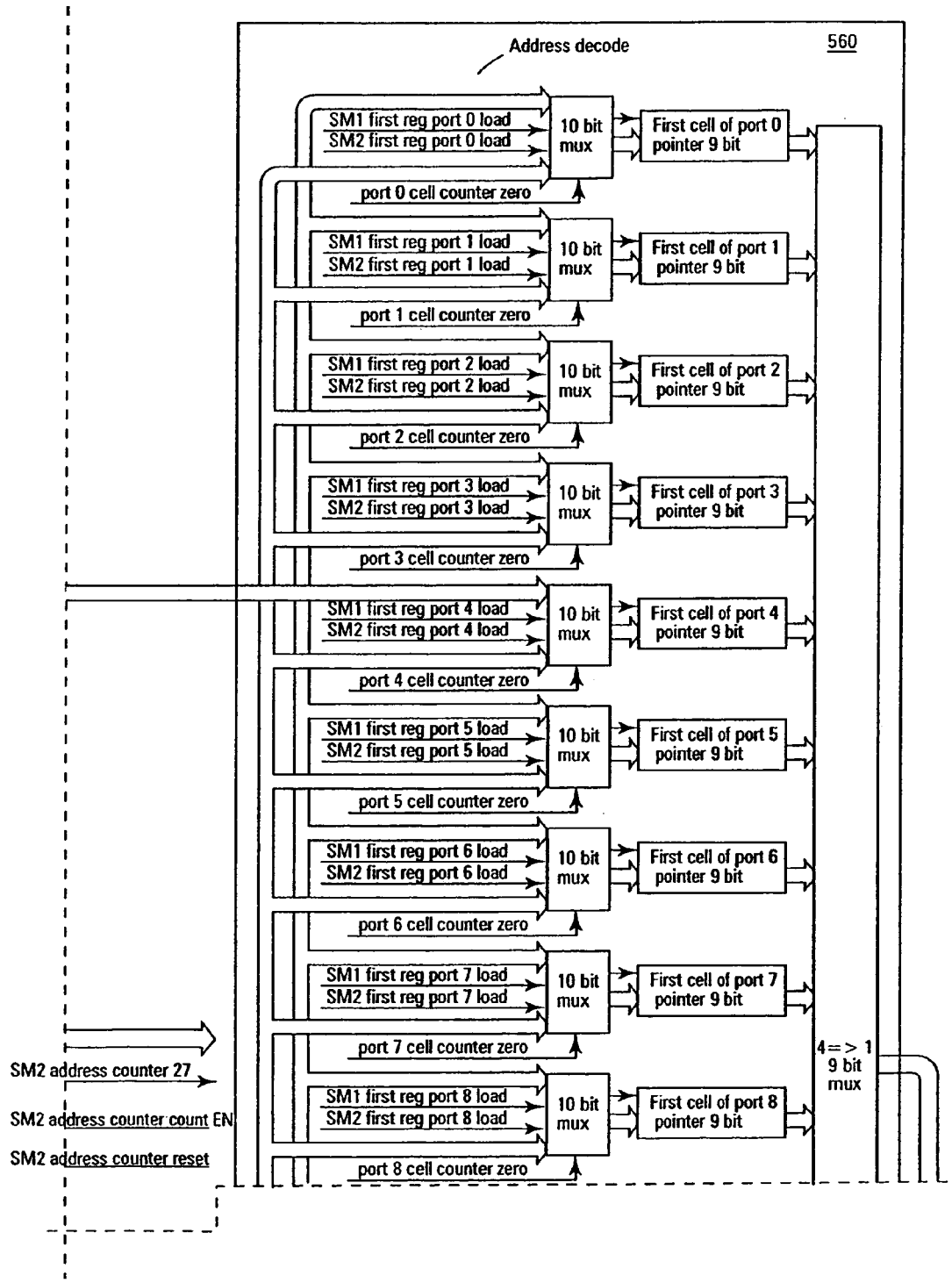
Figure 8D:
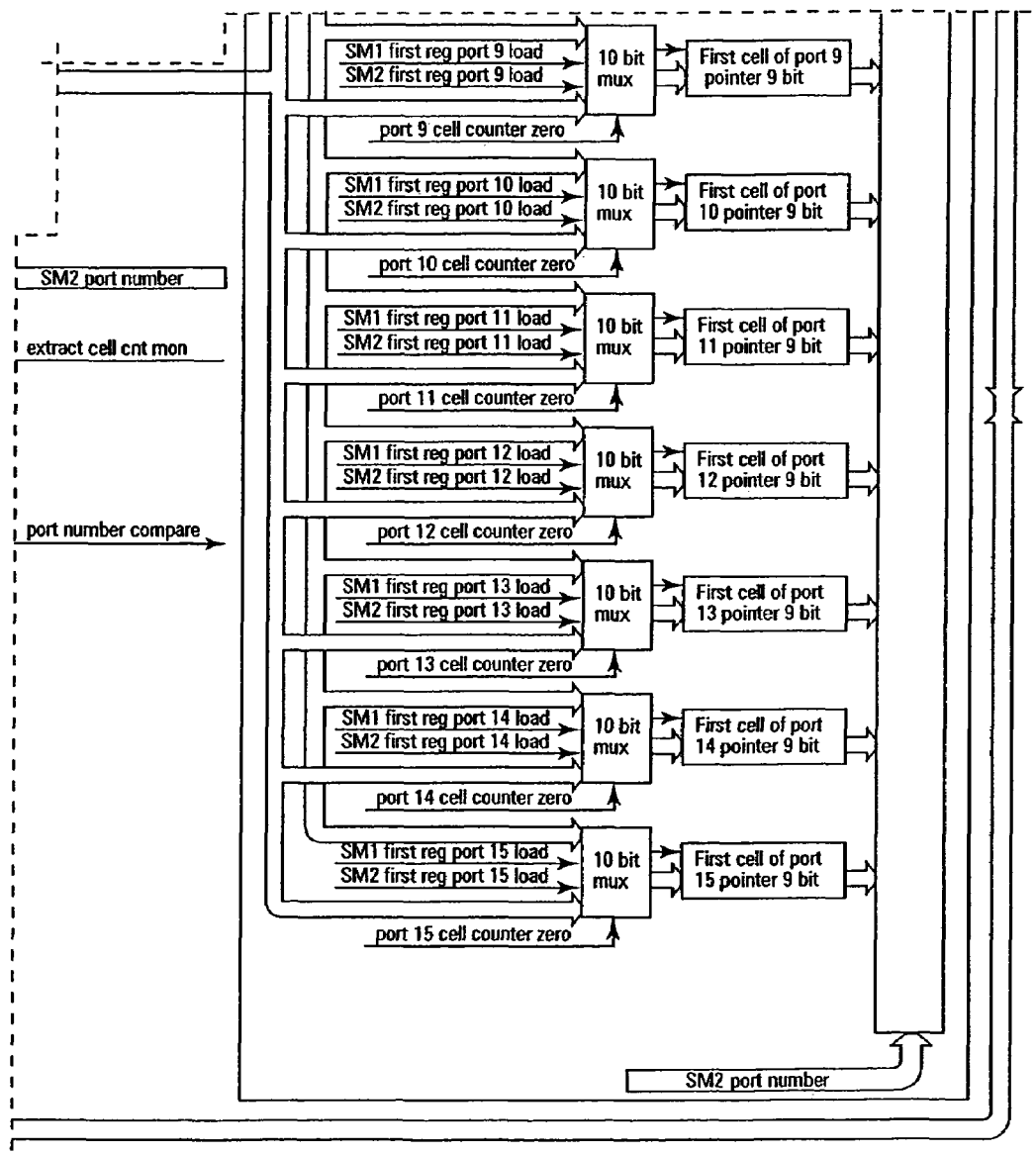

Referring to FIGS. 6a and 6b, one embodiment of a general linked list buffer monitor 214 of the present invention is described in greater detail. The general monitor circuit includes three nine-bit counters 410(1) to 410(3). One counter 410(3) monitors the total cells in the buffer, both CBR and UBR. Again, the buffer can store up to 512 cells. A second one of the counters 410(1) monitors the total UBR cells in the buffer, and the third counter 410(2) monitors the total CBR cells in the buffer. Each counter has two programmable threshold levels.

Counter 410(1) is compared to a total CLP threshold value 420 and a flow control threshold value 422. The total CLP threshold is used to provide an output signal 424 from comparator 430 to indicate if a buffer CLP limit has been violated. If the CLP threshold is violated, the cell is dropped from the LVDS port and the CLP counter is incremented. Likewise, if the flow control (overflow) threshold is violated, the cell is dropped and the overflow counter is incremented. That is, a signal 426 is provided from comparator 440. The UBR and CBR counters each have programmable CLP and overflow thresholds that are used to drop UBR and CBR cells, respectively, from the LVDS port. Thus, the CBR counter 410(2) has comparator circuits 450 and 452 to provide signals 454 and 456.

In operation, buffer counter 410(3) is incremented and decremented when any cell is inserted or extracted from the buffer. The UBR counter 410(1) is incremented and decremented when a when a UBR cell is inserted or extracted from the buffer. Further, the CBR counter 410(2) is incremented and decremented when a CBR cell is inserted or extracted from the buffer.

The general monitor circuit is configured to correspond to the five buffer modes described above. When the buffer is configured as either one or sixteen linked lists only the UBR counter 410(1) is enabled. If the buffer is configured as two, eight or ten lists with priority, the UBR and CBR counters are incremented or decremented based upon the CDP bit of the cell.

Three additional 16-bit counters are illustrated in FIG. 6. These counters include the overflow counter 460, the CLP counter 462 and a total LVDS counter 464. As described above, the overflow counter 460 and the CLP counter 462 are incremented when a cell is dumped from the LVDS ports because of an overflow or CLP threshold violation, respectively. The total LVDS counter 464 counts the total cells received from the LVDS, including dumped cells. Each of these counters can be read and reset.

The insert state machine 224 controls the flow of ATM cells from the LVDS ports to the linked list buffer. Referring to FIGS. 7a, 7b, 7c and 7d, one embodiment of the insert state machine 224 is described. The insert state machine includes a list address circuit 500. The list address circuit includes sixteen nine-bit last pointers 510(1)–510(16) and multiplex circuitry that indicate the location of the last inserted cell in the linked list. One of the last pointers is used to point to the next cell location of a linked list. The cell data received by the data in circuitry 520 and the linked list address 530 are stored in the buffer. If a received cell is dumped from the LVDS, the insert operation is not performed. The cell is dumped if: the buffer is full (512 cells); the linked list has an overflow threshold violation; there is a total UBR overflow threshold violation and the incoming cell is not a delay priority cell; there is a total CBR overflow threshold violation and the incoming cell is a delay priority cell; there is a total buffer CLP threshold violation and the incoming cell is a less priority cell; there is a CLP threshold violation for a current linked list and the incoming cell is a less priority cell; there is a UBR CLP threshold violation and the incoming cell is a less priority cell and not a delay priority cell; and there is a CBR CLP threshold violation and the incoming cell is a less priority cell and a delay priority cell.

The cell extraction state machine 236 of one embodiment is described with reference to FIGS. 8a, 8b, 8c and 8d. In one embodiment, the state machine includes address decode circuitry 560 to determine the address of the next cell in a linked list. As explained above, the extract state machine updates the counters in the monitors when a cell is extracted from the buffer.

CONCLUSION

A linked list buffer circuit has been described that can be configured to store different linked lists. The buffer includes insert logic and an insert state machine to add ATM cells to the linked lists in the buffer. Extract logic and an extract state machine allow for the removal of ATM cells from the linked lists in the buffer. Because, ATM cells can have different levels of priority, programmable monitor circuitry is provided to monitor the linked lists in the buffer. The monitor circuitry, including a linked list monitor and a general monitor, keep track of buffer and list capacity. The monitor circuitry also keeps track of cell loss priority and delay priority cells of the buffer and the linked lists. This information is used to drop received cells if necessary. The linked list monitor circuitry can be configured based upon the linked list configuration of the buffer. The linked list monitor can be configured by changing threshold levels provided to counter/comparator circuitry. Assignments of internal counter circuitry are also programmable based upon the buffer configuration.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An ATM buffer system comprising:
    a configurable buffer circuit to store a plurality of ATM linked lists;
    a linked list monitor to monitor the plurality of ATM linked lists, the linked list monitor is configurable to monitor different length linked lists;
    the configurable buffer circuit comprises:
        insert logic to insert ATM cells into the plurality of ATM linked lists; and
        extract logic to remove the ATM cells from the plurality of ATM linked lists; and
    the configurable buffer circuit further comprises first and second state machines to control the insert logic and the extract logic, respectively.

2. An ATM buffer system comprising:
    a configurable buffer circuit to store a plurality of ATM linked lists; and
    a linked list monitor to monitor the plurality of ATM linked lists, the linked list monitor is configurable to monitor different length linked lists;
    the linked list monitor comprises:
        a plurality of counter circuits;
        a plurality of comparator circuits coupled to the plurality of counter circuits, the plurality of comparator circuits compare a count from the plurality of counter circuits to first and second threshold values; and
        control circuitry coupled to the plurality of comparator circuits to selectively increment or decrement the count of the plurality of counter circuits.

3. The ATM buffer system of claim 2 wherein the control circuitry selectively controls the plurality of comparator circuits in response to a configuration of the buffer circuit.

4. The ATM buffer system of claim 2 wherein the first threshold value is an overflow threshold selected to correspond to a maximum length of an ATM linked list stored in circuit, and second threshold value is a cell loss priority (CLP) threshold selected to correspond to a desired list length based on a priority of ATM cells.

5. An ATM buffer system comprising:
    a configurable buffer circuit to store a plurality of ATM linked lists; and
    a linked list monitor to monitor the plurality of ATM linked lists, the linked list monitor is configurable to monitor different length linked lists; a general monitor circuit coupled to monitor the buffer circuit; the general monitor circuit comprises:
        an undefined bit rate (UBR) counter to count a number of UBR ATM cells stored in the buffer,
        an constant bit rate (CBR) counter to count a number of CBR ATM cells stored in the buffer, and
        a cell counter to count a total number of ATM cells stored in the buffer; the general monitor circuit comprises:

a CLP counter to count a number of non-priority ATM cells dropped from the buffer; and an overflow counter to count a number of ATM cells dropped from the buffer in response to an overflow condition.

6. An ATM buffer system comprising:

a configurable buffer circuit to store a plurality of ATM linked lists; and a linked list monitor to monitor the plurality of ATM linked lists, the linked list monitor is configurable to monitor different length linked lists; a general monitor circuit coupled to monitor the buffer circuit; the general monitor circuit comprises:

an undefined bit rate (UBR) counter to count a number of UBR ATM cells stored in the buffer;

an constant bit rate (CBR) counter to count a number of CBR ATM cells stored in the buffer; and a cell counter to count a total number of ATM cells stored in the buffer; the ATM buffer system further comprising:

first and second comparators to compare the count of the undefined bit rate (UBR) counter to a UBR cell loss priority (CLP) threshold value and a UBR overflow threshold, respectively;

third and fourth comparators to compare the count of the constant bit rate (CBR) counter to a CBR cell loss priority (CLP) threshold value and a CBR overflow threshold, respectively; and fifth and sixth comparators to compare the count of the overflow counter to a buffer cell loss priority (CLP) threshold value and a buffer overflow threshold, respectively.

7. A linked list buffer system comprising:

a buffer having a plurality of data storage locations, wherein the buffer can store a plurality of different linked list configurations; and a management system coupled to the buffer and comprising a plurality of counter circuits having adjustable threshold values, the adjustable threshold values can be programmed to correspond to the plurality of different linked list configurations of the buffer; the adjustable threshold values comprise an overflow threshold value and a cell loss priority threshold value.

8. A linked list buffer system comprising:

a buffer having a plurality of data storage locations, the buffer can store a plurality of different linked list configurations; and a management system coupled to the buffer and comprising a plurality of counter circuits having adjustable threshold values, the adjustable threshold values can be programmed to correspond to the plurality of different linked list configurations of the buffer; the plurality of different linked list configurations comprises one, two, eight, ten or sixteen linked lists; the plurality of counter circuits comprises sixteen counters and comparator circuits.

9. An asynchronous transfer mode (ATM) buffer system comprising:

a universal test and operations interface (UTOPIA) output connection;

a low voltage differential signal (LVDS) input connection;

a buffer circuit coupled between the LVDS input connection and the UTOPIA output connection, the buffer circuit comprises insert logic to insert ATM cells into the plurality of ATM linked lists stored in the buffer circuit, and extract logic to remove the ATM cells from the plurality of ATM linked lists;

a linked list monitor coupled to the buffer circuit and comprising a plurality of first counter circuits, a plurality of comparator circuits coupled to the plurality of first counter circuits, the plurality of comparator circuits compare a count from the plurality of first counter circuits to first and second threshold values, and control circuitry coupled to the plurality of comparator circuits to selectively increment or decrement the count of the plurality of first counter circuits.

10. The asynchronous transfer mode (ATM) buffer system of claim 9 wherein the first threshold value is an overflow threshold selected to correspond to a maximum length of an ATM linked list stored in the buffer circuit, and second threshold value is a cell loss priority (CLP) threshold selected to correspond to a desired list length based on a priority of ATM cells.

11. The asynchronous transfer mode (ATM) buffer system of claim 9 further comprising a general monitor circuit coupled to monitor the buffer circuit, wherein the general monitor circuit comprises:

an undefined bit rate (UBR) counter to count a number of UBR ATM cells stored in the buffer;

an constant bit rate (CBR) counter to count a number of CBR ATM cells stored in the buffer; and a cell counter to count a total number of ATM cells stored in the buffer.

12. The asynchronous transfer mode (ATM) buffer system of claim 10 further comprising;

first and second comparators to compare the count of the undefined bit rate (UBR) counter to a UBR cell loss priority (CLP) threshold value and a UBR overflow threshold, respectively;

third and fourth comparators to compare the count of the constant bit rate (CBR) counter to a CBR cell loss priority (CLP) threshold value and a CBR overflow threshold, respectively; and fifth and sixth comparators to compare the count of the overflow counter to a buffer cell loss priority (CLP) threshold value and a buffer overflow threshold, respectively.

13. A method of operating an ATM buffer comprising:

configuring the ATM buffer to store a plurality of linked lists;

establishing ATM cell length thresholds for the plurality of linked lists; and configuring a monitor circuit coupled to the ATM buffer to monitor the plurality of linked lists using the ATM cell length thresholds; the ATM cell length thresholds comprise an overflow threshold value equal to a maximum length of the plurality of linked lists, and a cell loss priority threshold value that is less than the overflow threshold value.

14. A method of operating an ATM buffer comprising:

configuring the ATM buffer to store a plurality of linked lists;

establishing ATM cell length thresholds for the plurality of linked lists; and configuring a monitor circuit coupled to the ATM buffer to monitor the plurality of linked lists using the ATM cell length thresholds; the monitor circuit comprises a plurality of selectable counter circuits and comparator circuits, during operation the comparator circuits receive the ATM cell length thresholds and compare the ATM cell length thresholds to a count in the counter circuits.

15. A method of operating an ATM buffer comprising:
receiving an ATM cell comprising a header and data, wherein the header includes an indication of a priority level of the ATM cell;
incrementing a count value of linked list length stored in the ATM buffer;
comparing the count value to a linked list length overflow threshold value;
determining if the count value exceeds the linked list length overflow threshold value;
comparing the count value to a linked list length priority threshold value; and
determining if the count value exceeds the linked list length priority threshold value.

16. The method of claim 15 further comprising storing the ATM cell in the ATM buffer if count value does not exceed the linked list length overflow threshold value or the linked list length priority threshold value.

17. The method of claim 16 further comprising storing the ATM cell in the ATM buffer if count value does not exceed the linked list length overflow threshold value, and the ATM cell is a priority cell.

18. The method of claim 15 further comprising not storing the ATM cell in the ATM buffer if count value exceeds the linked list length overflow threshold value, or count value exceeds the linked list length priority threshold value and the ATM cell is a low priority cell.

19. The method of claim 15 further comprising:
configuring the ATM buffer to store a plurality of linked lists; and
selecting the linked list length overflow threshold value and the linked list length priority threshold value based upon the plurality of linked lists.

* * * * *